(12) United States Patent
Hashino et al.

(10) Patent No.: US 6,195,390 B1
(45) Date of Patent: Feb. 27, 2001

(54) PICTURE SIGNAL ENCODING APPARATUS AND PICTURE SIGNAL DECODING APPARATUS

(75) Inventors: Tsukasa Hashino; Fumihiro Nagasawa; Tomoo Hayakawa, all of Kanagawa; Hiroshi Takiduka, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/039,220

(22) Filed: Mar. 13, 1998

(30) Foreign Application Priority Data

Mar. 17, 1997 (JP) .................................................... 9-063626

(51) Int. Cl.$^7$ ...................................................... H04B 1/66
(52) U.S. Cl. ........................................................ 375/240.21
(58) Field of Search ................................... 348/390, 391, 348/392, 43, 409, 415, 403, 416; 382/232, 238, 239; 370/94.1; 375/240, 245, 240.16, 240.15, 240.01, 240.21; H04N 7/12; H04B 1/66

(56) References Cited

U.S. PATENT DOCUMENTS

| | | | |
|---|---|---|---|
| 5,515,377 | * 5/1996 | Horne et al. | 370/94.1 |
| 5,619,256 | * 4/1997 | Haskell et al. | 348/43 |
| 5,742,343 | * 4/1998 | Haskell et al. | 348/415 |
| 5,818,531 | * 10/1998 | Yamaguchi et al. | 348/403 |
| 5,828,788 | * 10/1998 | Chiang et al. | 382/239 |
| 5,886,736 | * 3/1999 | Chen | 348/43 |
| 5,973,742 | * 10/1999 | Gardyne et al. | 348/416 |
| 5,995,150 | * 11/1999 | Hsieh et al. | 348/409 |

FOREIGN PATENT DOCUMENTS 0 692 915 A2 1/1996 (EP) .

* cited by examiner

Primary Examiner—Chris S. Kelley
Assistant Examiner—Tung Vo
(74) Attorney, Agent, or Firm—Frommer Lawrence & Haug, LLP; William S. Frommer; Joe H. Shallenburger

(57) ABSTRACT

A picture signal encoding apparatus and a picture signal decoding apparatus are disclosed. The picture signal encoding apparatus includes: first compression coding device for converting and compression-coding basic picture signals having a sampling frequency ratio of a luminance signal and two color-difference signals of 4:2:2 to have a sampling frequency ratio of the luminance signal and the two color-difference signals of 4:1:1 or 4:2:0 so as to generate first compressed data; encoding residual extracting device for extracting an encoding residual between the basic picture signals and the compressed data; and second compression coding device for compression-coding the extracted encoding residual so as to generate second compressed data. The picture signal decoding apparatus includes: first expansion decoding device for expansion-decoding basic picture data of a predetermined signal standard having a sampling frequency ratio of a luminance signal and two color-difference signals of 4:1:1 or 4:2:0, the basic picture data being generated by compression-coding original picture signals; second expansion decoding device for expansion-decoding enhancement data having a sampling frequency ratio of a luminance signal and two color-difference signals of 4:2:2; and synthesizing device for synthesizing outputs from the first expansion decoding device and the second expansion decoding means so as to generate extended picture data having a sampling frequency ratio of a luminance signal and two color-difference signals of 4:2:2.

32 Claims, 13 Drawing Sheets

PICTURE SIGNAL ENCODING APPARATUS AND PICTURE SIGNAL DECODING APPARATUS

BACKGROUND OF THE INVENTION

1. Field of the Invention

This invention related to a picture signal encoding apparatus for compression-coding picture signals and a picture signal decoding apparatus for expansion-decoding compression-coded picture signals.

2. Description of the Related Art

A digital video tape recorder (VTR) is used as means for recording/reproducing picture signals of a television broadcasting program or the like. There are several formats of the digital VTR, such as, the d1 standard for program production and the d2 standard for broadcasting stations. With respect to such digital VTR for program production or for broadcasting stations, since extremely high quality is required of pictures to be recorded/reproduced, it is normal that picture signals to be recorded onto a magnetic tape are not compressed, or that a relatively low compression rate for compressing the data quantity to approximately ½ is used.

Meanwhile, the digital VTR for commercial use is becoming broadly used. The digital VTR for commercial use needs to enable long-time recording using a compact cassette tape, though the requirement of picture quality is lower than that of the digital VTR for business use. Therefore, a compression format for performing band compression at a relatively high compression rate for compressing the picture data quantity to approximately ⅕ is employed. The compression format of the digital VTR for commercial use provides high picture quality, and therefore used also for video equipments for broadcasting business. The high-efficiency compression method used here utilizes the fact that the human visual characteristic is less sensitive to color-difference information than to luminance information of a picture, and therefore, the information amount of color-difference signals is reduced. This picture data compression method will be described later.

In accordance with the above-described D1 standard as a digital VTR standard for program production or for broadcasting stations, digital picture data to be recorded onto a magnetic tape are not compressed, and a luminance signal Y and color-difference signals Cr, Cb are separately recorded. The color-difference signals are signals obtained by removing the luminance signal Y from three primary colors of R, G and B. As the color-difference signals, two signals of Cr=R−Y and Cb=B−Y are employed. For example, the sampling frequency of the luminance signal Y is 13.5 MHz and the sampling frequency of each of the color-difference signals Cb, Cr is 6.75 MHz. Therefore, the ratio of sampling frequency of these signals is 4:2:2.

On the other hand, with respect to picture data in conformity to the above-described digital VTR standard for commercial use, the sampling frequency ratio of the luminance signal Y and the color-difference signals Cb, Cr is expressed as 4:1:1 in the NTSC system (with 525 lines) or 4:2:0 in the PAL system (with 625 lines). That is, by reducing the sampling frequency of the two color-difference signals to half the sampling frequency of the luminance signal, the information amount of picture data to be recorded on a magnetic tape is reduced. Thus, in accordance with the digital VTR standard for commercial use, a signal is generated such that the band of a chroma signal of a base band signal is narrowed, and digital compression by intra-frame DCT is carried out to compress the picture data quantity to approximately ⅕ for recording.

As described above, the picture data compression systems (formats) which differ from one another are used for the digital VTR, and there is no digital VTR which can handle plural data compression formats. Therefore, for example, when the compressed picture data of 4:1:1 and the compressed picture data of 4:2:2 as described above are to be edited, editing operation must be carried out after temporarily expanding either one of the compressed picture data, and deterioration in picture quality generated in re-compressing the edited picture data cannot be avoided.

In addition, with respect to the digital VTR for broadcasting business in which high picture is required, higher picture quality exceeding the performance of the conventional digital VTR is required in some cases. For example, a base band of 4:2:2 is required, or a picture having less compression noise is required. Also, with respect to the digital VTR for commercial use, adoption of a standard for higher picture quality is expected.

SUMMARY OF THE INVENTION

It view of the foregoing status of the art, it is an object of the present invention to provide a picture signal encoding apparatus and a picture signal decoding apparatus which have compatibility between picture data of 4:1:1 or 4:2:0 in conformity to the format of the conventional digital picture data and high-quality picture data of 4:2:2.

According to the present invention, there is provided a picture signal encoding apparatus for compression-coding picture signals, the apparatus including: first compression coding means for converting and compression-coding basic picture signals having a sampling frequency ratio of a luminance signal and two color-difference signals of 4:2:2 to have a sampling frequency ratio of the luminance signal and the two color-difference signals of 4:1:1 or 4:2:0 so as to generate first compressed data; encoding residual extracting means for extracting an encoding residual between the basic picture signals and the compressed data; and second compression coding means for compression-coding the extracted encoding residual so as to generate second compressed data.

According to the present invention, there is also provided a picture signal decoding apparatus for expansion-decoding compression-coded picture signals, the apparatus including: first expansion decoding means for expansion-decoding basic picture data of a predetermined signal standard having a sampling frequency ratio of a luminance signal and two color-difference signals of 4:1:1 or 4:2:0, the basic picture data being generated by compression-coding original picture signals; second expansion decoding means for expansion-decoding enhancement data having a sampling frequency ratio of a luminance signal and two color-difference signals of 4:2:2; and synthesizing means for synthesizing outputs from the first expansion decoding means and the second expansion decoding means so as to generate extended picture data having a sampling frequency ratio of a luminance signal and two color-difference signals of 4:2:2.

According to the present invention, there is also provided a picture signal encoding apparatus for compression-coding picture signals, the apparatus including: converting means for converting the picture signals having a sampling frequency ratio of a luminance signal and two color-difference signals of 4:2:2 to basic picture signals having a sampling frequency ratio of a luminance signal and two color-difference signals of 4:1:1 or 4:2:0; first compressing means to which the basic picture signals converted by the converting means are inputted, the first compressing means being adapted for carrying out first compression so as to output first compressed data; encoding residual extracting means for extracting an encoding residual between the basic picture signals before compression and signals generated by decoding the compressed data; and second compressing means to which data indicating the extracted encoding residual is inputted, the second compressing means being adapted for outputting second compressed data generated by carrying out predetermined compression of the data.

According to the present invention, there is further provided a picture signal decoding apparatus for decoding compressed picture signals, the apparatus including: first decoding means for decoding compressed first picture signals having a sampling frequency ratio of a luminance signal and two color-difference signals of 4:1:1; second decoding means for decoding compressed second picture signals having a sampling frequency ratio of a luminance signal and two color-difference signals of 4:2:2; and synthesizing means for synthesizing an output from the first decoding means and an output from the second decoding means so as to generate picture signals having a sampling frequency ratio of a luminance signal and two color-difference signals of 4:2:2.

DETAILED DESCRIPTION OF PREFERRED EMBODIMENTS

Preferred embodiments of the picture signal encoding apparatus and the picture signal decoding apparatus of the present invention will now be described in detail with reference to the drawings.

Figure 1:
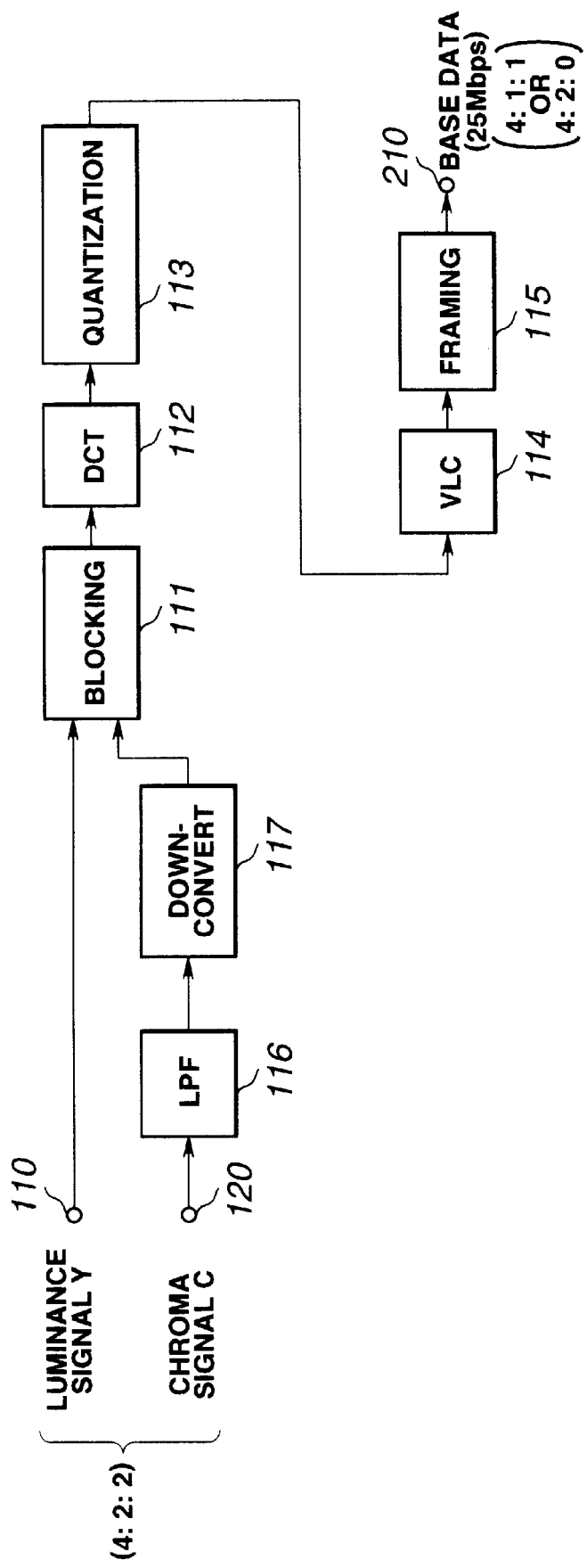
FIG. 1 is a block diagram showing the structure of a first encoding device of the present invention for encoding base data.

FIG. 1 is a block diagram showing the basic structure of a conventional digital VTR encoding device and first compression coding means in the picture signal encoding apparatus according to the present invention. A luminance signal Y of original picture signals as extended data of 4:2:2, inputted from an input terminal 110, is sent to a blocking section 111. Two color-difference signals Cr, Cb of chroma signals C of the original picture signals, inputted from an input terminal 120, are sent via a LPF (low-pass filter) 116 to a down-converter 117, where the color-difference signals are down-converted to half the initial sampling frequency and then sent to the blocking section 111.

The blocking section 111 blocks the luminance signal Y from the input terminal 110 and the two down-converted color-difference signals from the down-converter 117, on the macroblock (hereinafter referred to as MB) basis. The blocked picture signal is converted to a DCT coefficient by a DCT (discrete cosine transform) section 112, quantized by a quantizer 113, coded by variable length coding by a VLC (variable length coding) section 114, and then framed by a framing section 115. Then, the framed data is outputted from an output terminal 210 as compressed digital picture data of 4:1:1 in the NTSC system or as compressed digital picture data of 4:2:0 in the PAL system.

Figure 2:
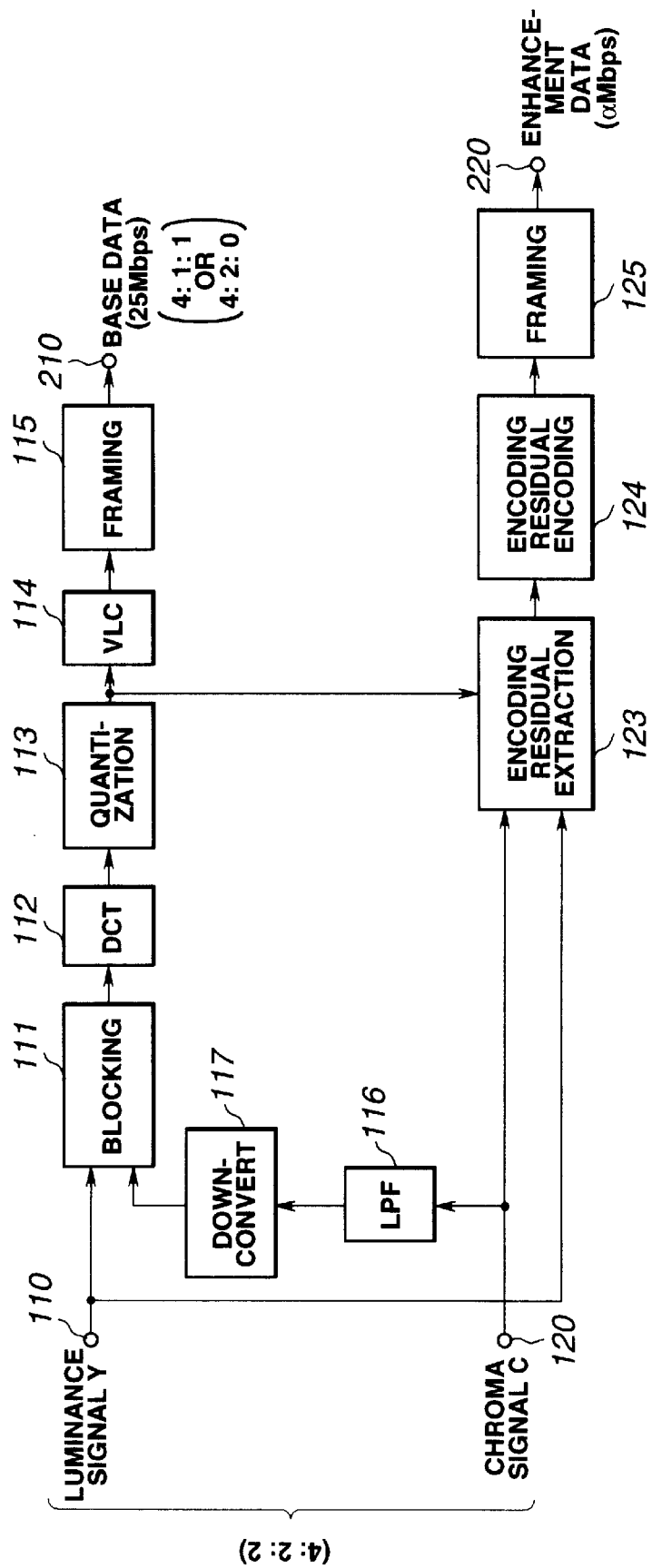
FIG. 2 is a block diagram showing the structure of an entire picture signal encoding apparatus as an embodiment of the present invention.

FIG. 2 is a block diagram showing the structure of an entire picture signal encoding apparatus which has the first compression coding means for generating base data as shown in FIG. 1, and second compression coding means for extracting an encoding residual from the output of the first compression coding means and the original picture signals of 4:2:2 so as to generate enhancement data.

In this picture signal encoding apparatus, compression is carried out by limiting the band of the original picture signals having a sampling frequency ratio of the luminance signal Y and the chroma signals C of 4:2:2 so as to generate base data, and enhancement data which is data lost in compression coding (hereinafter referred to as encoding residual data) is generated from the difference value between the compression-coded data and the original picture data.

The luminance signal Y of the original picture signal of 4:2:2 inputted from the input terminal 110 is supplied to the blocking section 111. To this blocking section 111, the chroma signals C inputted from the input terminal 120 are also supplied via the LPF (low-pass filter ) 116 and the down-converter 117.

Using the luminance signal Y of the inputted original signals, and the chroma signals (with the sampling frequency ratio of Y and the two color-difference signals Cr, Cb of the chroma signals being 4:1:1 (or 4:2:0 in the case of the PAL system)) which have been converted to have a lower sampling frequency than the chroma signals C of the original picture signals (with the sampling frequency ratio of Y and the two color-difference signals Cr, Cb of C being 4:2:2), one frame of picture data is divided into macroblocks (8 pixels×8 lines) as basic units of DCT transform. Since the color-difference signal has only one block (one sample) for 4 blocks (4 samples) of the luminance signal, one DCT block of the color-difference signal corresponds to 4 DCT blocks of the luminance signals.

The down-converter 117 is adapted for converting (down-converting) the sampling frequency of the two color-difference signals Cr, Cb supplied via the LPF 116, to a lower frequency. Specifically, the down-converter 117 down-converts the sampling frequency to ½ of the initial frequency.

The LPF 116 is adapted for carry out band limitation of the color-difference signals in order to avoid generation of aliasing noise in sampling at the down-converter 117 on the subsequent stage.

The DCT section 112 performs DCT (discrete cosine transform) as a type of orthogonal transform on the DCT block formed by the blocking section 111. The pixel value of the picture data is made non-correlative and converted to a value on the frequency axis. The macroblocks transformed by discrete cosine transform are temporarily stored in a buffer, not shown, on the segment basis which employs 5 macroblocks as one unit, and then sent to the quantizer 113.

The quantizer 113 divides the DCT coefficient by a given divisor (quantization step) with respect to every macroblock, and rounds the fraction to carry out quantization. At this point, adaptive quantization using different quantization steps is carried out in consideration of the human visual characteristic. The visual characteristic considered at this point is such that quantization distortion is not conspicuous in a portion having high precision on a picture screen even if rough quantization is carried out, while quantization distortion is likely to be conspicuous in a smoothly changing portion.

The above-described adaptive quantization is carried out by classifying each block in the segment of picture data into 4 classes, for example, and then allocating different quantization steps constituting the quantizer, in accordance with the class numbers. Thus, by increasing bit allocation to the block where deterioration in visual picture quality on the screen is conspicuous, the picture quality may be improved. The picture data (DCT coefficient) thus quantized is sent to the VLC (variable length coding) section 114 and an encoding residual extraction section 123 as later described.

The VLC section 114 performs variable length coding, such as, two-dimensional Huffman coding. Specifically, when a quantizer number (QNo.) is selected on the basis of data quantity estimate, the picture data segment stored in the above-described buffer is quantized by the quantizer having this QNo., and then coded by variable length coding.

The framing section 115 carries out processing, referred to as framing, to allocate each segment of the picture data coded by variable length coding by the VLC section 114, to 77 bytes. With respect to a macroblock having a data quantity exceeding 77 bytes among the above-described 5 macroblocks, overflow data is allocated and packed to a free area of another macroblock. Thus, the data quantities of the macroblocks are equalized, and basic picture data (base data) having a sampling frequency of the luminance signal Y and the color-difference signals Cr, Cb of 4:1:1 or 4:2:0 is outputted from the output terminal 210 at a rate of 25 Mbps. This base data is compression-coded digital picture data in conformity to the format (DV format) of the conventional digital picture data, as described above.

The encoding residual extraction section 123 is supplied with the luminance signal Y of the original signals of 4:2:2 inputted from the input terminal 110, the chroma signal C of the original signals inputted from the input terminal 120, and the quantized picture data from the quantizer 113. The encoding residual extraction section 123 then extracts an encoding residual.

The encoding residual extracted here is extracted by, for example, using the original picture data having the sampling frequency ratio of the luminance signal Y and the two color-difference signals Cr. Cb of 4:2:2, and the DCT coefficient of the compressed picture data (base data) down-converted from the chroma signal in such a manner that the sampling frequency ratio becomes 4:1:1 or 4:2:0. That is, the encoding residual, that is, data lost in quantization, is extracted by using the original picture data and the DCT coefficient quantized by the first compression means.

An encoding residual encoder 124 encodes the picture data which is the encoding residual extracted by the encoding residual extraction section 123. In this case, various encoding methods may be employed, such as, DCT (discrete cosine transform) or subband coding.

A framing section 125 carries out framing of the encoding residual encoded by the encoding residual encoder 124 and outputs the framed encoding residual as enhancement data from an output terminal 220. The rate ($\alpha$ Mbps) of the enhancement data may be set in accordance with the requirement. For example, when $\alpha$=25 Mbps, extended picture data of 4:2:2 is encoded together with the base data at 50 Mbps.

The enhancement data is picture data including high-frequency components of the luminance signal Y and the chroma signal C which are not included in the base data but are necessary for expressing details of the picture. By appending the enhancement data to the base data, extended picture data which is high-quality picture data of 4:2:2 used for the digital VTR for business use may be formed. The details thereof will be described later.

In the following description, DCT coding is employed as an encoding method by the encoding residual encoder 124 as the second compression coding means. However, the picture signal encoding apparatus of the present invention is not limited to DCT coding, and various encoding methods may be employed, such as, wavelet transform, subband coding, and DPCM (differential pulse code modulation). That is, an arbitrary encoding method for the encoding residual may be employed as the second compression coding means.

Also, in the following description, embodiments will be described in which various methods are employed for extraction of the encoding residual by the encoding residual extraction section 123 and for encoding by the encoding residual encoder 124.

Figure 3:
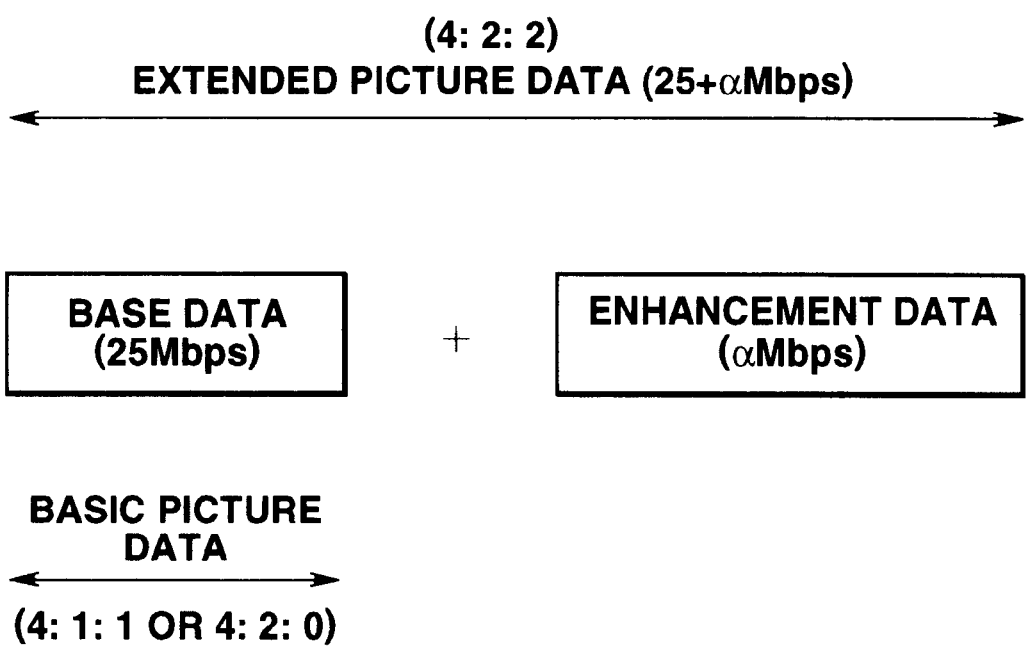
FIG. 3 is a view for explaining the configuration of compressed digital picture data generated by the picture signal encoding apparatus of the present invention.

FIG. 3 is a view schematically showing the configuration of the digital picture data generated by compression-coding the picture signal by the above-described picture signal encoding apparatus of the present invention. Specifically, the compression-coded data generated by the picture signal encoding apparatus according to the present invention is formed by appending enhancement data including high-frequency components of the luminance signal Y and the chroma signal C to base data as basic picture of 4:1:1 (in the NTSC system) or 4:2:0 (in the PAL system).

The base data is picture data in conformity to the compression format of the conventional digital picture data. The transfer rate of this base data is normally 25 Mbps. The transfer rate ($\alpha$ Mbps) of the enhancement data is suitably set in accordance with the requirement. For example, in the case where extended picture data of 4:2:2 at 50 Mbps is formed by appending this enhancement data to the base data, the transfer rate of the enhancement data is 25 Mbps ($\alpha$=25).

With such data configuration, it suffices to use only the base data, if compatibility with the format of the conventional digital picture data is necessary, that is, if the picture data of 4:1:1 or 4:2:0 is necessary. Also, to obtain higher picture quality, extended picture data substantially of 4:2:2 may be formed by appending enhancement data including high-frequency components of the luminance signal Y and the chroma signal C to the base data. That is, the base data and the enhancement data are inputted to a multiplexer, not shown, where the two data are multiplexed to output the extended picture data. The extended picture data may be transmitted to a predetermined transmission line or recorded on a predetermined recording medium. If the extended picture data is transmitted to the transmission line, the extended picture data is converted to the transmission format of the transmission line, for example, the ATM format in the case of an ATM transmission line. As a matter of course, the base data and the enhancement data may also be transmitted to a predetermined transmission line or a predetermined recording medium without being multiplexed by the multiplexer.

A picture signal decoding apparatus of the present invention will now be described.

Figure 4:
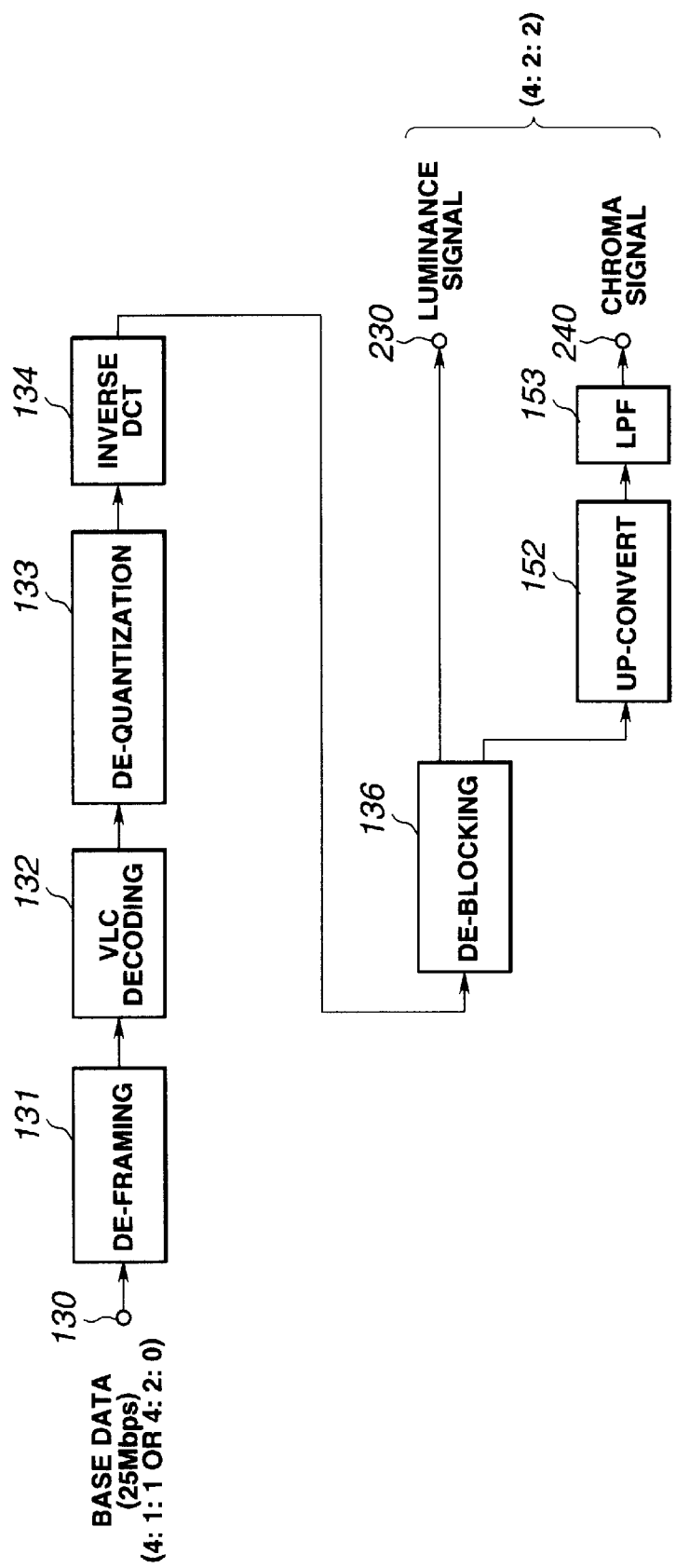
FIG. 4 is a block diagram showing the structure of a first picture signal decoding device of the present invention for decoding base data.

FIG. 4 is a block diagram showing the basic structure of a conventional digital VTR decoding device and first expansion-decoding means for decoding base data outputted from the first compression-coding means in the picture signal encoding apparatus. Compressed digital picture data of 4:1:1 or 4:2:0 inputted from an input terminal 130 is de-framed by a de-framing section 131, decoded by a VLC (variable length coding) decoder 132, de-quantized by a de-quantizer 133, and transformed by inverse DCT transform by an inverse DCT section 134. The transformed data is de-blocked by a de-blocking section 136.

The luminance signal Y from the de-blocking section 136 is outputted from an output terminal 230, and the chroma signal C is transmitted through an up-converter 152 and a LPF (low-pass filter) 153 and outputted from an output terminal 240.

Figure 5:
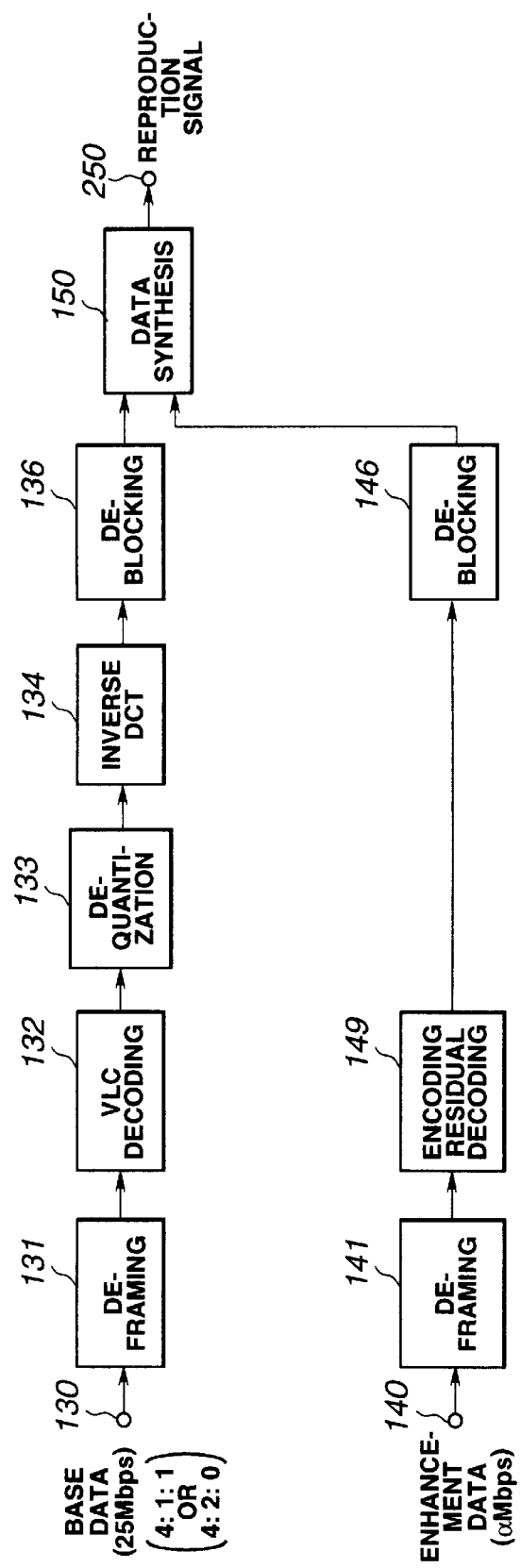
FIG. 5 is a block diagram showing the structure of an entire picture signal decoding apparatus as an embodiment of the present invention.
Figure 6:
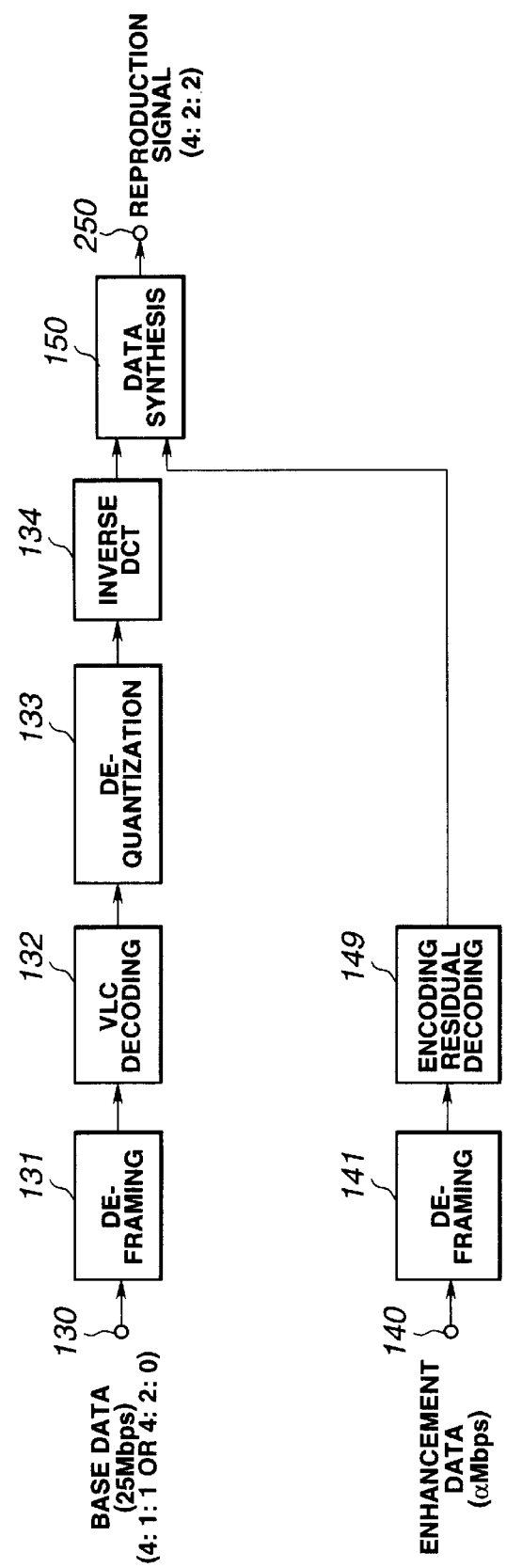
FIG. 6 is a block diagram showing a modification of the structure of the picture signal decoding device as the embodiment of the present invention.
Figure 7:
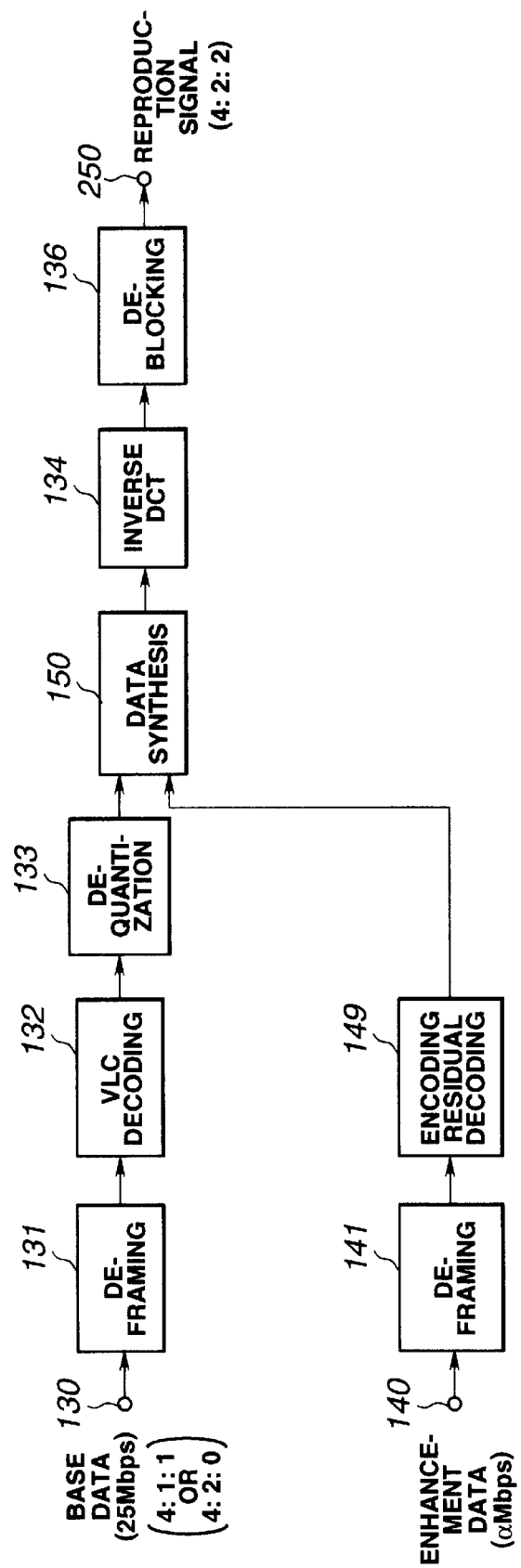
FIG. 7 is a block diagram showing another modification of the picture signal decoding device as the embodiment of the present invention.

FIGS. 5 to 7 are block diagrams showing the structure of an entire decoding apparatus of the present invention which has the first expansion-decoding means for decoding base data as shown in FIG. 4, and second expansion-decoding means for decoding enhancement data.

The decoding apparatus of the present invention has different structures as shown in FIGS. 5 to 7, because decoding slightly differs depending on the method of extracting the encoding residual by the encoding residual extraction section 123 of the present invention shown in FIG. 2.

Specifically, the decoding apparatus shown in FIG. 5 has a structure corresponding to an encoding apparatus in which enhancement data is outputted by extracting an encoding residual from the difference between a 4:2:2 original picture and (locally decoded) data generated by expanding down-converted, DCT-transformed and quantized compressed data.

The decoding apparatus shown in FIG. 6 has a structure corresponding to an encoding apparatus in which enhancement data is outputted by extracting an encoding residual from the difference between data generated by down-converting an original picture to 4:1:1 and blocking the down-converted data into macroblocks, and the above-described locally decoded data.

The decoding apparatus shown in FIG. 7 has a structure corresponding to an encoding apparatus in which enhancement data is outputted by extracting an encoding residual from the difference between data generated by down-converting an original picture to 4:1:1 and carrying out DCT transform and quantization of the down-converted data, and the locally decoded data.

The structure of the encoding apparatus including the specific structure of the encoding residual extraction section 123 for extraction the encoding residual will be later described in detail.

The structure of FIG. 5 is first described.

To the input terminal 130, base data (25 Mbps) as compressed picture data having a sampling frequency ratio of 4:1:1 or 4:2:0 is inputted. To an input terminal 140, enhancement data ($\alpha$ Mbps) is inputted.

The de-framing section 131 carries out processing, referred to as de-framing, which is the inverse operation of the framing by the framing section 115 of the picture signal encoding apparatus of FIG. 2, onto the base data inputted from the input terminal 130, so as to cancel the framing. Thus, the data is returned to DCT coefficient data coded by variable length coding.

The VLC (variable length coding) decoder 132 is adapted to carry out the inverse operation of the encoding by the VLC (variable length coding) section 114 of the picture signal encoding apparatus of FIG. 2. The VLC decoder 132 carries out decoding, such as, two-dimensional Huffman coding, so as to decode the data coded by variable length coding.

The de-quantizer 133 carries out the inverse operation of the quantization by the quantizer 113 of the picture signal encoding apparatus of FIG. 2. That is, the de-quantizer 133 multiplies each DCT coefficient by a quantization step, on the above-described (8×8)-pixel block basis.

The inverse DCT (inverse discrete cosine transform) section 134 performs inverse discrete cosine transform (inverse DCT) which is the inverse transform of the discrete cosine transform (DCT), on the de-quantized block basis. The output of the inverse DCT section 134 is inputted to the de-blocking section 136, where the inverse processing of the processing of the blocking section 111 of FIG. 2 is carried out, thus cancelling the blocking of DCT-blocked data. The output of the de-blocking section 136 is outputted to a data synthesis section 150.

On the other hand, a de-framing section 141 carries out de-framing of the enhancement data inputted from the input terminal 140.

An encoding residual decoder 149 decodes the enhancement data in which the encoding residual has been encoded, by the inverse procedure of the encoding by the encoding residual encoder 124 of the picture signal encoding apparatus of FIG. 2. Then, a de-blocking section 146 cancels the blocking of DCT-blocked data. The output of the de-blocking section 146 is sent to the data synthesis section 150.

The data synthesis section 150 synthesizes the decoded base data from the inverse DCT section 134 and the decoded enhancement data from the encoding residual decoder 149, and the synthesized data is outputted as a reproduction picture signal of 4:2:2 from an output terminal 250.

The above-described picture signal decoding apparatus corresponds to an encoding apparatus in which an encoding residual is extracted to output enhancement data by using original picture data of 4:2:2 and locally decoded data generated by temporarily expanding compressed data while base data is outputted.

FIG. 6 shows the structure of the picture signal decoding apparatus in the case where the difference value between data generated by down-converting an original picture to 4:1:1 and blocking the down-converted picture into macroblocks, and locally decoded data, is extracted as an encoding residual by the encoding residual extraction section 123 of the picture signal encoding apparatus shown in FIG. 2, as described above. In this case, since the same blocking method is used for the base data and the enhancement data, de-blocking is carried out by a common de-blocking section provided in the data synthesis section 150. Therefore, the structure of FIG. 6 differs from that of FIG. 5 in that the de-blocking sections 136, 146 are included in the data synthesis section 150.

FIG. 7 shows the structure of the picture signal decoding apparatus in the case where the difference value between data generated by down-converting an original picture, then macroblocking the down-converted picture, and carrying out DCT transform and quantization, and locally decoded data, is extracted as an encoding residual in the picture signal encoding apparatus shown in FIG. 2, as described above. In this case, the structure of FIG. 7 differs from those of FIGS. 5 and 6 in that after data generated by de-quantizing the base data and data generated by decoding the encoding residual are synthesized, the data is transformed by inverse DCT transform by the inverse DCT section 134 and de-blocked by the de-blocking section 136.

The method for extracting the encoding residual in the picture signal encoding apparatus may be exemplified by a method using the difference (differential picture) between an original picture and a picture generated by (locally) decoding down-converted picture data, a method using the difference (coefficient difference) between the DCT coefficient of an original picture signal and the DCT coefficient of picture data generated by carrying out quantization and de-quantization after down-conversion, and a method using a band division filter, such as, subbands, for carrying out band division of a picture signal and a band synthesis filter for reconstructing the band-divided picture signal, as described above.

The specific structure of the decoding apparatus corresponding to the encoding apparatus including the specific structure of the encoding residual extraction section 123 for extracting the encoding residual will now be described in detail with reference to FIGS. 8 to 13.

Figure 8:
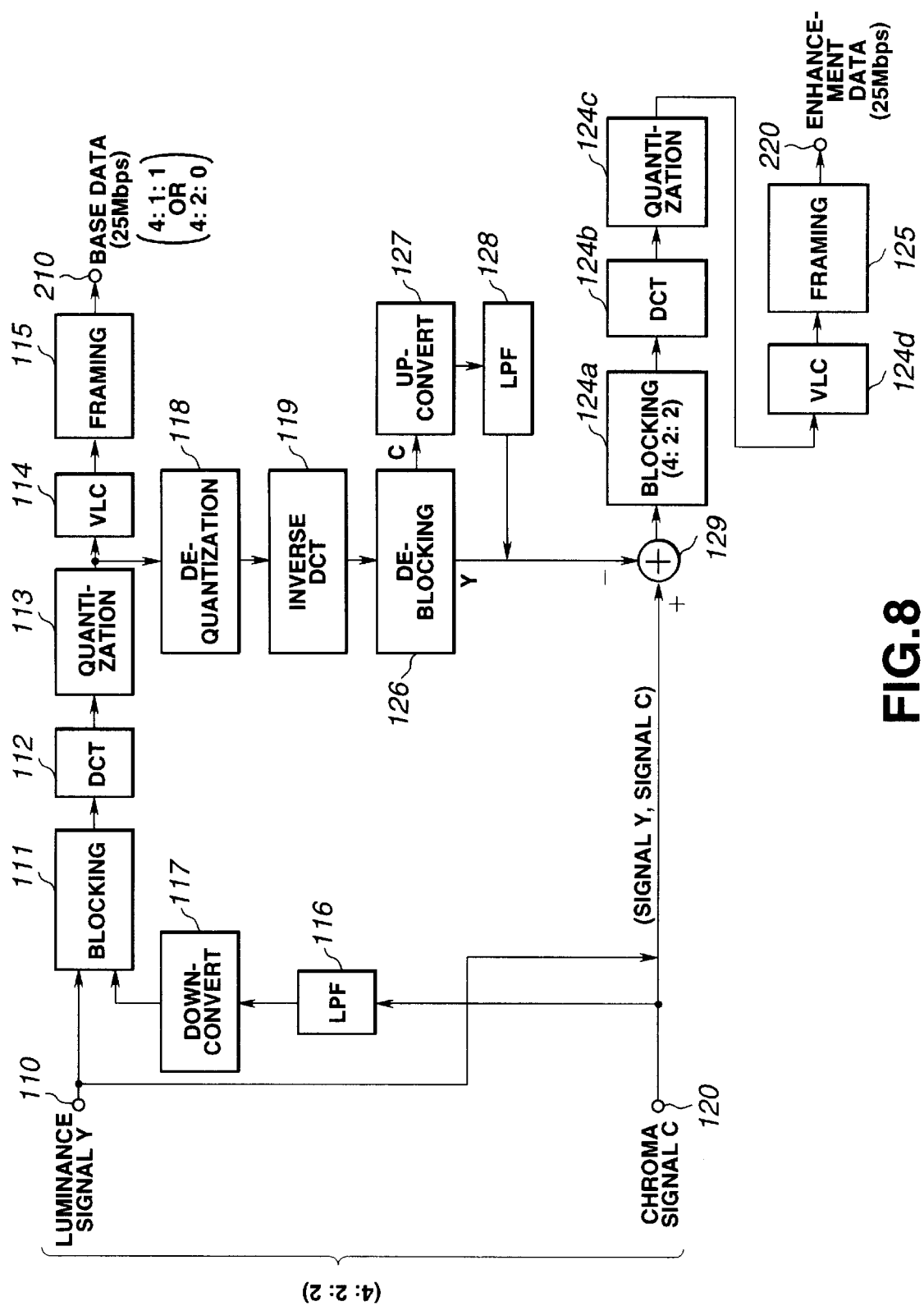
FIG. 8 is a block diagram showing a first embodiment of the picture signal encoding apparatus of the present invention.
Figure 9:
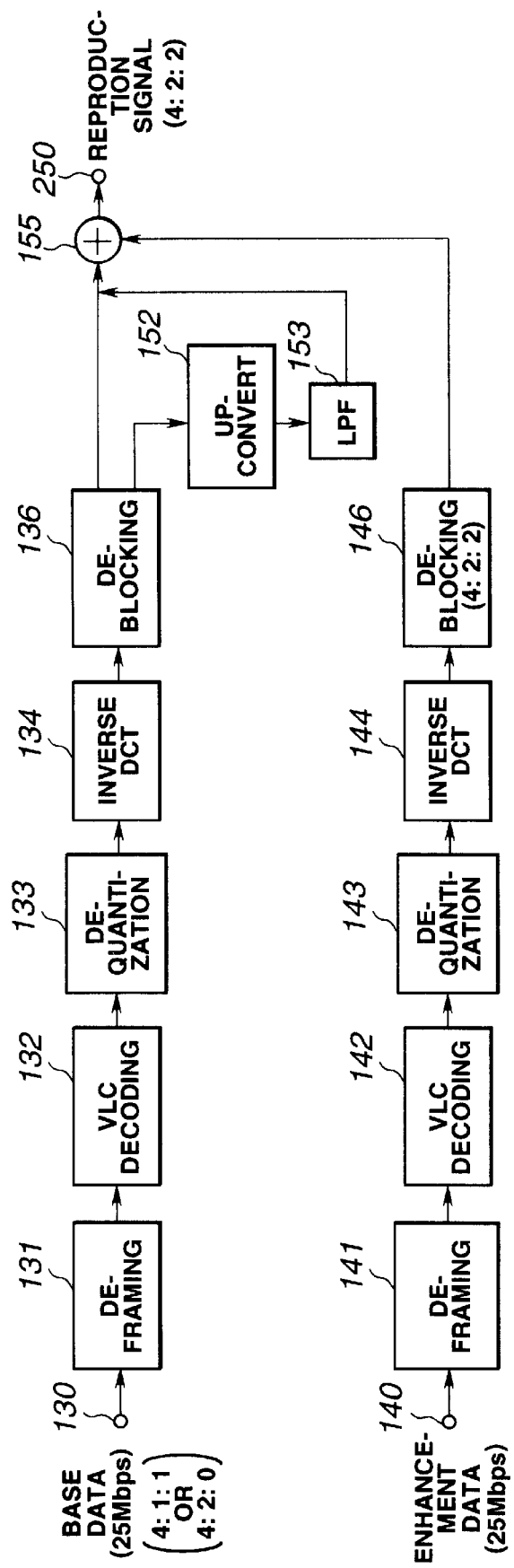
FIG. 9 is a block diagram showing a first embodiment of the picture signal decoding apparatus of the present invention.

FIG. 8 shows the encoding apparatus in the case where the difference value between an original picture of 4:2:2 and locally decoded data is extracted as an encoding residual. FIG. 9 shows the detailed structure of the decoding apparatus corresponding to FIG. 8 (i.e., details of FIG. 5).

Figure 10:
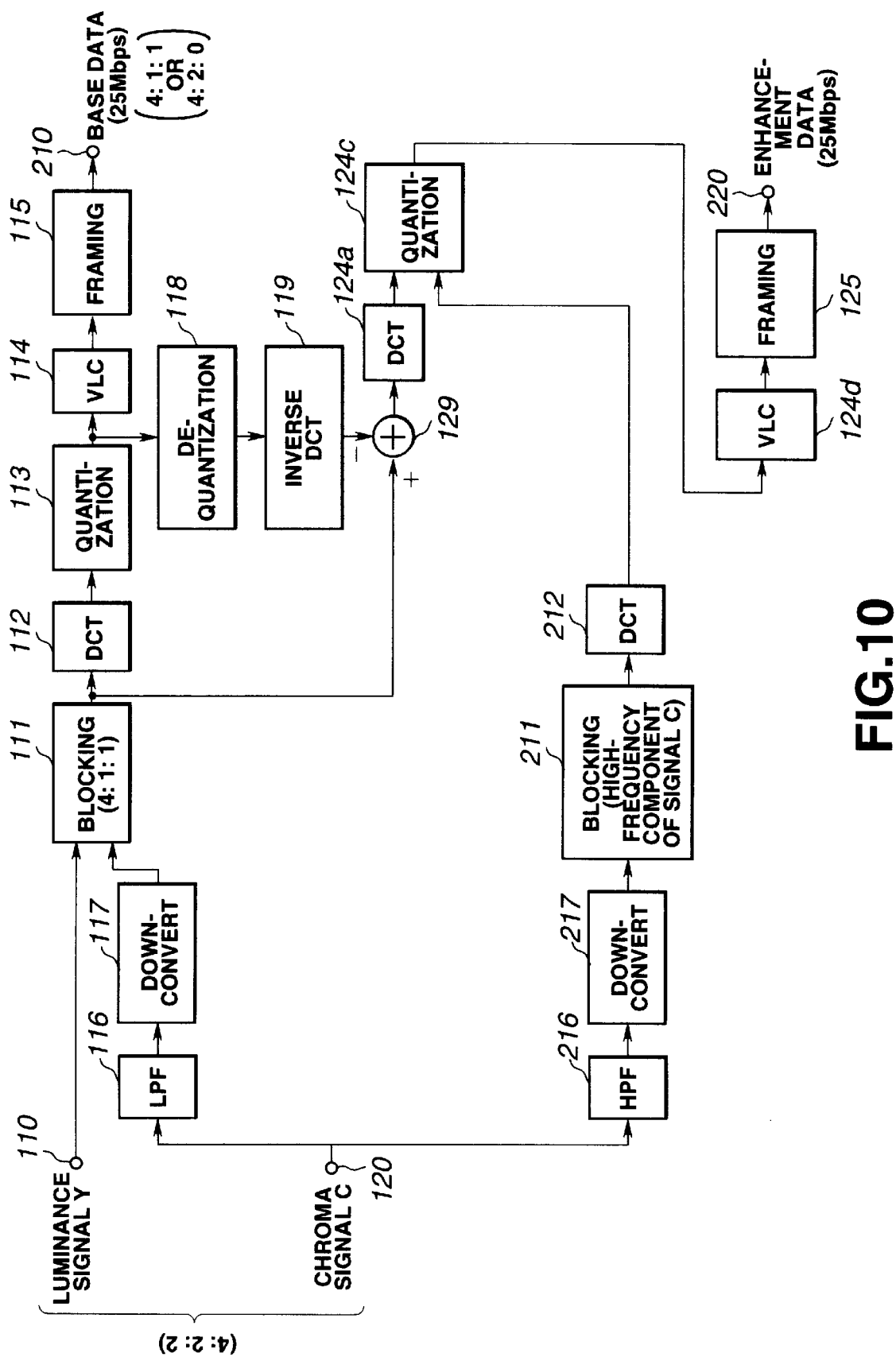
FIG. 10 is a block diagram showing a second embodiment of the picture signal encoding apparatus of the present invention.
Figure 11:
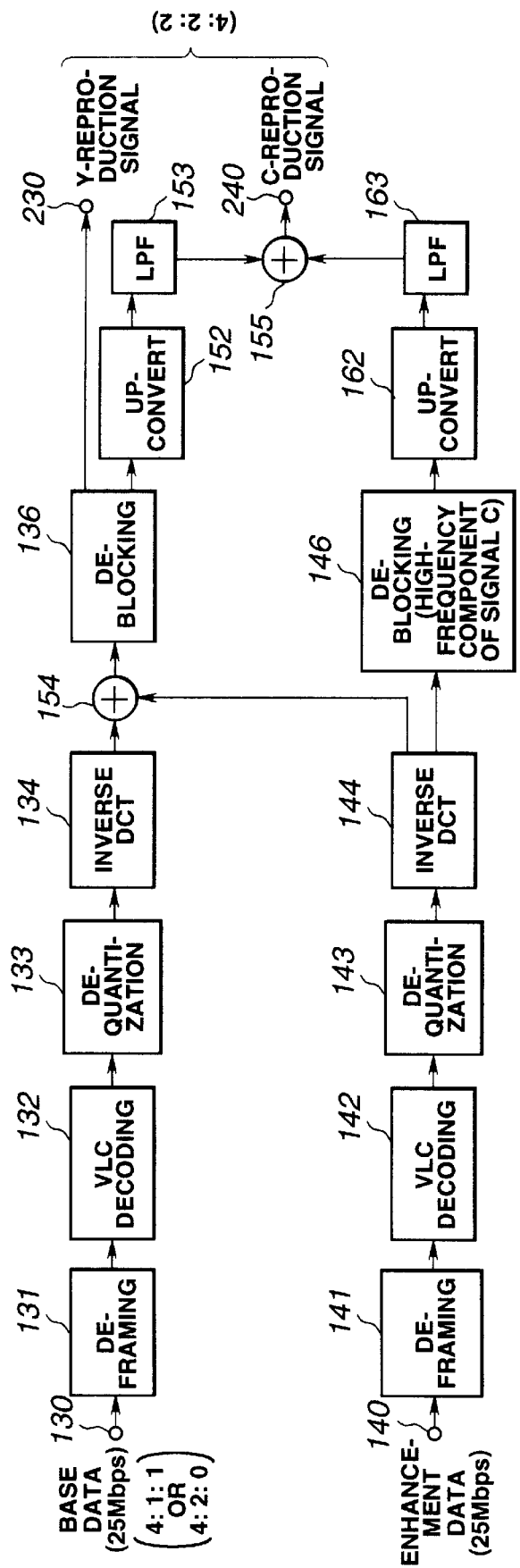
FIG. 11 is a block diagram showing a second embodiment of the picture signal decoding apparatus of the present invention.

FIG. 10 shows the detailed structure of the encoding apparatus in the case where an encoding residual is extracted from the difference between macroblocks generated by blocking to 4:1:1 and locally decoded data. FIG. 11 shows the detailed structure of the decoding apparatus corresponding to FIG. 10 (i.e., details of FIG. 6).

Figure 12:
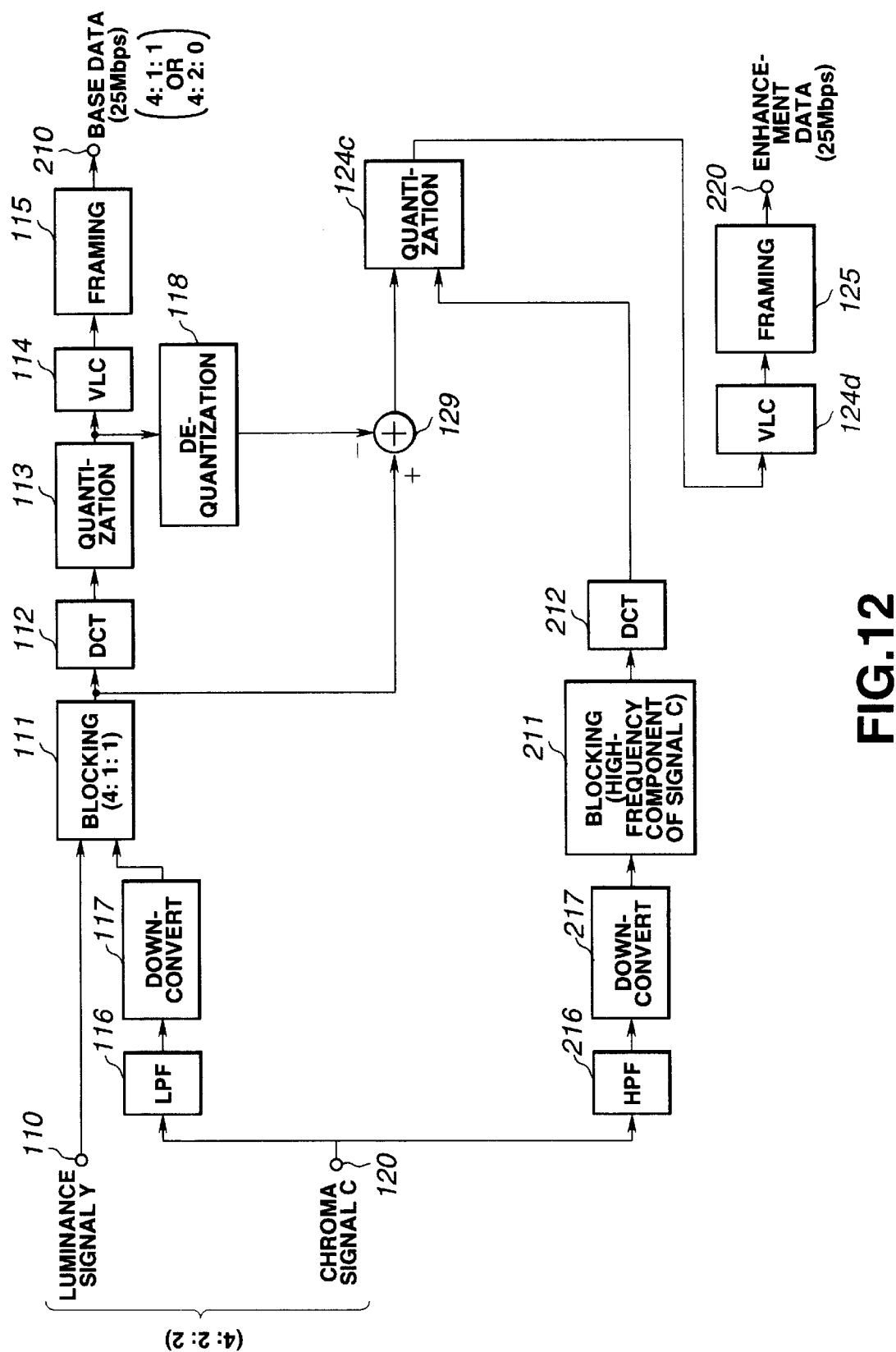
FIG. 12 is a block diagram showing a third embodiment of the picture signal encoding apparatus of the present invention.
Figure 13:
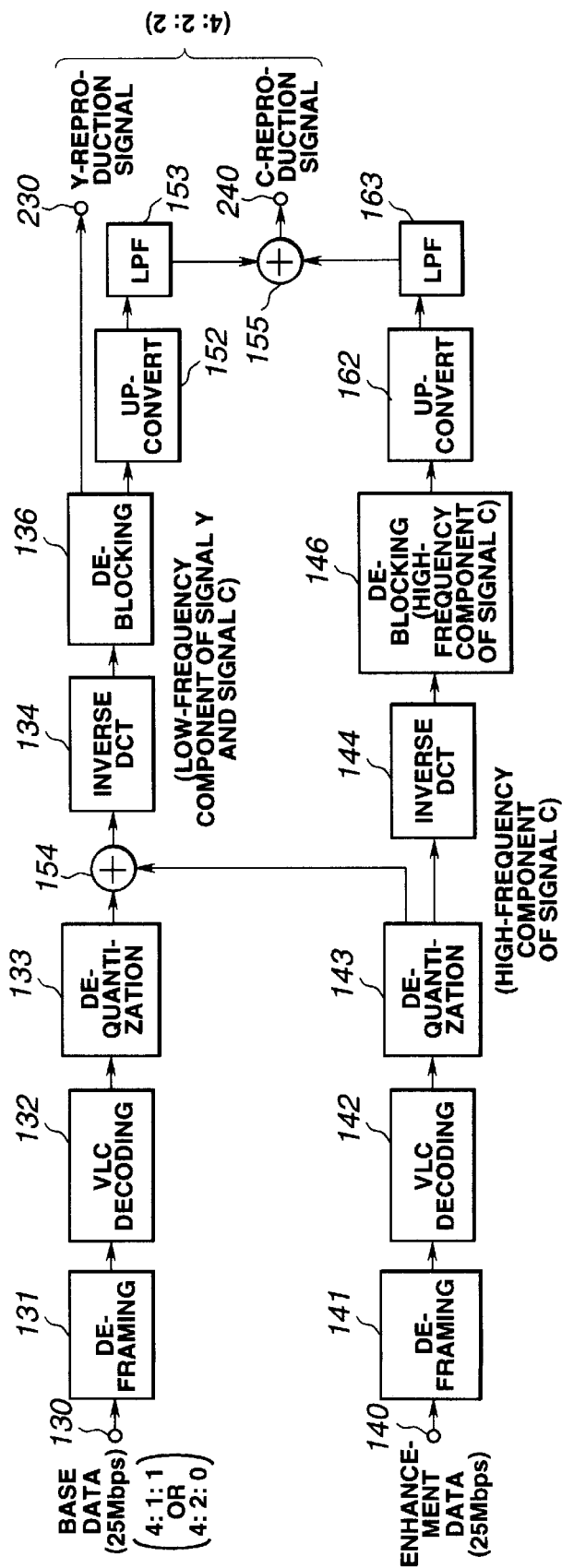
FIG. 13 is a block diagram showing a third embodiment of the picture signal decoding apparatus of the present invention.

FIG. 12 shows the specific structure of the encoding apparatus in the case where an encoding residual is extracted from the difference between the DCT coefficient and locally decoded data. FIG. 13 shows the detailed structure of the decoding apparatus corresponding to FIG. 12 (i.e., details of FIG. 7).

This picture signal encoding apparatus is adapted for generating enhancement data by using the difference value (differential picture) between an original picture of 4:2:2 and a locally decoded picture.

In this picture signal encoding apparatus, an LPF 116, a down-converter 117, a blocking section 111, a DCT section 112, a quantizer 113, a VLC section 114, and a framing section 115 are sections for generating base data. The structure and function of these sections are similar to those in the above-described picture signal encoding apparatus as shown in FIG. 2 and therefore will not be described further in detail. The sections for generating enhancement data are mainly described here. The sections common with those of the above-described picture signal encoding apparatus are denoted by the same reference numerals in FIG. 8 and will not be described further in detail.

In this picture signal encoding apparatus, a signal generated by down-converting the sampling frequency of a chroma signal C of an original picture signal of 4:2:2 to ½ is added to a luminance signal Y of the original picture signal, thus generating a picture signal of 4:1:1 or 4:2:0. The sampling frequency of the chroma signal C of a signal generated by locally decoding the picture signal of 4:1:1 or 4:2:0 is up-converted again to twice the down-converted sampling frequency, and then the difference value between the up-converted signal and the original picture signal is extracted as an encoding residual.

The section for extracting the encoding residual in the picture signal encoding apparatus of FIG. 8 includes a de-quantizer 118, an inverse DCT section 119, a de-blocking section 126, a LPF section 127, an up-converter 128 and an adder 129. That is, the section corresponds to the residual extraction section 123 of the picture signal encoding apparatus shown in FIG. 2.

The se-quantizer 118 de-quantizes the quantized DCT coefficient as base data, and sends the de-quantizes DCT coefficient to the inverse DCT section 119.

The inverse DCT section 119 carries out inverse DCT (inverse discrete cosine transform) of the DCT coefficient of the picture data of 4:1:1 or 4:2:0 which has been de-quantized by the de-quantizer 118, and sends the transformed DCT coefficient to the de-blocking section 126.

The chroma signal C of the locally decoded picture signal of 4:1:1 or 4:2:0 is sent to the up-converter 128 and the LPF 127 so as to be up-converted. The up-converted chroma signal C is added to the luminance signal Y of the locally decoded picture signal, and then inputted as an inverse input to the adder 129.

The up-converter 128 increases the sampling frequency of the chroma signal C of the locally decoded picture signal of 4:1:1 to twice so that the difference between the original picture of 4:2:2 and the locally decoded picture signal of 4:1:1 or 4:2:0 is calculated by the adder 129.

The adder 129 subtracts the locally decoded picture data from the chroma signal C of the original picture signal of 4:2:2 inputted from an input terminal 120, and extracts the difference value as an encoding residual. The extracted encoding residual is inputted to a blocking section 124a.

The encoding residual extracted by the adder 129 is encoded and outputted as enhancement data from an output terminal 220. The picture signal encoding apparatus of FIG. 8 has the structure in the case where the encoding residual is encoded by using DCT. In this picture signal encoding apparatus, the section for encoding the encoding residual includes the blocking section 124a, a DCT section 124b, a quantizer 124c, a VLC section 124d and a framing section 125. This section corresponds to the encoding residual encoder 124 of the picture signal encoding apparatus of FIG. 2.

The blocking section 124a to the framing section 125 are similar to the blocking section 111 to the framing section 115 of FIG. 2, and therefore, will not be described further in detail.

FIG. 9 is a block diagram showing the structure of the picture signal decoding apparatus corresponding to the first embodiment of the picture signal encoding apparatus of the present invention shown in FIG. 8.

The sections common with those in the picture signal decoding apparatus of FIG. 5 are denoted by the same reference numerals in FIG. 9. In this picture signal decoding apparatus, the section from a de-framing section 131 to an inverse DCT section 134 and the section from a de-framing section 141 to an inverse DCT section 144, adapted for expansion-decoding base data inputted from an input terminal 130, have the same structure as in the picture signal decoding apparatus of FIG. 5, and therefore, will not be described further in detail.

The base data inputted from the input terminal 130 is expansion-decoded through the de-framing section 131, a VLC decoder 132, a de-quantizer 133, the inverse DCT section 134, a de-blocking section 136, an up-converter 152 and a LPF 153.

On the other hand, enhancement data inputted from an input terminal 140 is decoded and returned to a differential signal through the de-framing section 141, a VLC decoder 142, a de-quantizer 143, the inverse DCT section 144 and a de-blocking section 146.

The luminance signal Y of the decoded base data from the de-blocking section 136 is directly sent to an adder 155. The chroma signal C of the base data is transmitted through the up-converter 152 and the LPF 153 and then added to the luminance signal Y. Thus, a reproduction picture signal of the base data up-converted to 4:2:2 is sent to the adder 155.

The up-converter 152 and the LPF 153 increase the sampling frequency of the locally decoded picture signal to twice so that the original picture signal of 4:2:2 and the locally decoded picture signal of 4:1:1 are added by the adder 155.

The adder 155 adds the base data from the de-blocking section 136 which has been decoded and up-converted to 4:2:2, to the decoded enhancement data from the de-blocking section 146. The picture signal from the adder 155 is outputted as the reproduction picture signal from an output terminal 250.

A second embodiment of the picture signal encoding apparatus and the picture signal decoding apparatus of the present invention will now be described.

FIG. 10 shows the structure of the picture signal encoding apparatus in the case where an encoding residual is extracted by using a differential picture and a band division filter so as to generate enhancement data.

A chroma signal C of an original signal of 4:2:2 inputted from an input terminal 120 is divided into two frequency bands by a LPF (low-pass filter) 116 and a HPF (high-pass filter) 216 which are band division filters for dividing the frequency band. Since low-frequency components of the chroma signal C outputted from the LPF 116 are of the same band as the band of a chroma signal of digital picture data outputted as base data, the low-frequency components are encoded together with a luminance signal Y inputted from an input terminal 110 so as to be outputted as base data of 4:1:1 or 4:2:0 from an output terminal 210. In other words, high-frequency components of the chroma signal C which are not included in the base data are extracted as a residual on the side of the HPF 216 of the band division filters.

An adder 129 extracts, as an encoding residual, the difference value between a picture of 4:1:1 or 4:2:0 from a blocking section 110 and a picture generated by DCT-coding the picture signal of 4:1:1 or 4:2:0 and locally decoding the DCT-coded picture signal through a de-quantizer 118 and an inverse DCT section 119. The extracted encoding residual is the difference value between the luminance signal Y and the low-frequency components of the chroma signal C of the picture signal.

The extracted encoding residual from the adder 129 is DCT-coded by a DCT section 124a as second compression coding means, and then sent to a quantizer 124c.

On the other hand, the high-frequency components of the chroma signal C outputted from the HPF 216 are down-converted by a down-converter 217. The down-converted high-frequency components are blocked by a blocking section 211, then DCT-coded by a DCT section 212, and then sent to the quantizer 124c.

The DCT coefficient of the residual between the luminance signal Y and the low-frequency components of the chroma signal C from the DCT section 124a, and the DCT coefficient of the high-frequency components of the chroma signal C from the DCT section 212, are quantized by the quantizer 124c, then coded by variable length coding by a VLC section 124d, then framed by a framing section 125, and outputted as enhancement data from an output terminal 220.

FIG. 11 is a block diagram showing the structure of the picture signal decoding apparatus corresponding to the second embodiment of the picture signal encoding apparatus of the present invention shown in FIG. 10.

The base data inputted from an input terminal 130 is decoded through a de-framing section 131, a VLC decoder 132, a de-quantizer 133 and an inverse DCT section 134. After the DCT coefficient from the inverse DCT section 134 and the difference value between the luminance signal and the low-frequency components of the chroma signal as part of the enhancement data returned to the encoding residual through a de-framing section 141, a VLC decoder 142, a de-quantizer 143 and an inverse DCT section 144 is added by an adder 154, the added signal is de-blocked by a de-blocking section 136, and becomes an output reproduction signal of the luminance signal Y from an output terminal 230. On the other hand, the low-frequency components of the chroma signal C are up-converted by an up-converter 152 and a LPF 153, and then synthesized with the high-frequency components of the chroma signal C as a part of the enhancement data outputted from the inverse DCT section 144 and transmitted through a de-blocking section 146, an up-converter 162 and a HPF 163, so as to be outputted as the chroma signal C from an output terminal 240.

Thus, high-quality picture data of 4:2:2 is reproduced from the base data and the enhancement data.

A third embodiment of the picture signal encoding apparatus and the picture signal decoding apparatus of the present invention will now be described.

FIG. 12 shows the structure of the picture signal encoding apparatus in the case where an encoding residual is extracted by using a coefficient difference and a band division filter so as to generate enhancement data.

This picture signal encoding apparatus differs from the picture signal encoding apparatus of FIG. 10 in that the difference value on the DCT coefficient level between the DCT coefficient of an original picture signal and base data is used as the encoding residual for generating enhancement data, instead of using the difference value between the original picture signal and the picture signal generated by locally decoding the base data.

In this picture signal encoding apparatus, the section from a de-blocking section 111 to a framing section 115 for generating base data is similar to the means for generating base data in the picture signal encoding apparatus shown in FIG. 10, and therefore, will not be described further in detail. Only the section for generating enhancement data is described here.

A chroma signal C of an original signal of 4:2:2 inputted from an input terminal 120 is divided into two frequency bands by a LPF (low-pass filter) 116 and a HPF (high-pass filter) 216 which are band division filter for dividing the frequency band. Since low-frequency components of the chroma signal C outputted from the LPF 116 are of the same band as the band of a chroma signal C of digital picture data outputted as base data 4:1:1 or 4:2:0, the low-frequency components are encoded together with a luminance signal Y inputted from an input terminal 110 so as to be outputted as base data of 4:1:1 or 4:2:0 from an output terminal 210.

An adder 129 extracts, as an encoding residual, the DCT coefficient difference value between the DCT coefficient of a picture of 4:1:1 or 4:2:0 which is blocked by a blocking section 111 and DCT-transformed by a DCT section 112, and the DCT coefficient generated by forming the DCT coefficient of the picture signal of 4:1:1 or 4:2:0 and de-quantizing the DCT coefficient through a de-quantizer 118. The extracted encoding residual is sent to a quantizer 124c.

On the other hand, the high-frequency components of the chroma signal C outputted from the HPF 216 are down-converted by a down-converter 217. The down-converted high-frequency components are blocked by a blocking section 211, then DCT-coded by a DCT section 212, and then sent to the quantizer 124c.

The DCT coefficient from the adder 129 and the DCT coefficient from the DCT section 212 are quantized by the quantizer 124c, then coded by variable length coding by a VLC section 124d, then framed by a framing section 125, and outputted as enhancement data from an output terminal 220.

FIG. 13 is a block diagram showing the structure of the picture signal decoding apparatus corresponding to the third embodiment of the picture signal encoding apparatus of the present invention shown in FIG. 12.

The base data of 4:1:1 or 4:2:0 inputted from an input terminal 130 is returned to the DCT coefficient through a de-framing section 131, a VLC decoder 132 and a de-quantizer 133. Similarly, the enhancement data inputted from an input terminal 140 is returned to the DCT coefficient through a de-framing section 141, a VLC decoder 142 and a de-quantizer 143. The DCT coefficient from the de-quantizer 133 and the DCT coefficient from the de-quantizer 143 are added by an adder 154, and sent to an inverse DCT section 134. Then, the resulting signal is de-blocked by a de-blocking section 136 and outputted as the luminance signal Y from an output terminal 230.

The synthesis output from the adder 154 is generated by decoding the difference value between the luminance signal Y of the original picture signal and the low-frequency components of the chroma signal C.

The output from the de-blocking section 136 is up-converted through an up-converter 152 and a LPF 153, and the signal from a de-blocking section 146 are up-converted through an up-converter 162 and a HPF 163. Then, the up-converted signals are added by an adder 155 and outputted as a chroma reproduction signal C from an output terminal 240.

Thus, extended picture data of 4:2:2 is reproduced.

In the above-described embodiments, the enhancement data including the luminance signal Y and the high-frequency components of the chroma signal C is appended to the base data of 4:1:1 or 4:2:0, thus forming high-quality extended picture data of 4:2:2. However, the sampling frequency ratio of the high-quality picture data is not limited to 4:2:2 and may be 4:4:4, for example. In this case, the frequency components of the enhancement data appended to the base data are higher than the sampling frequency employed in the embodiments.

In the picture signal encoding apparatus and the picture signal decoding apparatus according to the present invention, base data generated by compression-coding basic picture data having a sampling frequency ratio of a luminance signal Y and two color-difference signals of chroma signals C of picture signals of 4:1:1 or 4:2:0 is appended to enhancement data including high-frequency components of the chroma signal C, thereby forming compressed picture data having a sampling frequency ratio substantially equal to 4:2:2. With this data configuration, it suffices to transfer only the base data when compatibility with picture signals in conformity to the format of 4:1:1 or 4:2:0 of the conventional digital picture data is required. On the other hand, when extended picture data of 4:2:2 enabling realization of a high-precision picture is required, the enhancement data may be appended to the base data. Thus, high-quality picture data which has compatibility between these digital picture data of different compression formats may be provided.

What is claimed is:

1. A picture signal encoding apparatus for compression-coding picture signals, the apparatus comprising:
    first compression coding means for converting and compression-coding basic picture signals having a sampling frequency ratio of a luminance signal and two color-difference signals of 4:2:2 to have a sampling frequency ratio of the luminance signal and the two color-difference signals of 4:1:1 or 4:2:0 so as to generate first compressed data;
    encoding residual extracting means for extracting an encoding residual between the basic picture signals and the compressed data; and
    second compression coding means for compression-coding the extracted encoding residual so as to generate second compressed data.

2. The picture signal encoding apparatus as claimed in claim 1, wherein the first compression coding means has sampling frequency converting means for converting the sampling frequency of a chroma signal of the picture signals.

3. The picture signal encoding apparatus as claimed in claim 1, wherein the first compression coding means and the second compression coding means carry out compression coding, using discrete cosine transform.

4. The picture signal encoding apparatus as claimed in claim 1, wherein the second compression coding means carries out compression coding, using wavelet transform or subband coding.

5. The picture signal encoding apparatus as claimed in claim 1, further comprising a band division filter for dividing the frequency band of a chroma signal of the picture signals.

6. The picture signal encoding apparatus as claimed in claim 1, wherein the encoding residual extracting means extracts a difference between original picture signals having a sampling frequency ratio of a luminance signal and two color-difference signals of 4:2:2 and decoded picture signals having a sampling frequency ratio of a luminance signal and two color-difference signals of 4:1:1 or 4:2:0.

7. The picture signal encoding apparatus as claimed in claim 1, wherein the encoding residual extracting means extracts a difference between decoded picture signals having a sampling frequency ratio of a luminance signal and two color-difference signals of 4:1:1 and original picture signals having the sampling frequency ratio of a luminance signal and two color-difference signals converted to 4:1:1.

8. The picture signal encoding apparatus as claimed in claim 1, wherein the encoding residual extracting means extracts a difference between decoded picture signals having a sampling frequency ratio of a luminance signal and two color-difference signals of 4:2:0 and original picture signals having the sampling frequency ratio of a luminance signal and two color-difference signals converted to 4:2:0.

9. The picture signal encoding apparatus as claimed in claim 1, wherein the encoding residual extracting means extracts a difference between a DCT coefficient of picture signals having a sampling frequency ratio of a luminance signal and two color-difference signals of 4:1:1 and a DCT coefficient of original picture signals having the sampling frequency ratio of a luminance signal and two color-difference signals converted to 4:1:1.

10. The picture signal encoding apparatus as claimed in claim 1, wherein the encoding residual extracting means extracts a difference between a DCT coefficient of picture signals having a sampling frequency ratio of a luminance signal and two color-difference signals of 4:2:0 and a DCT coefficient of original picture signals having the sampling frequency ratio of a luminance signal and two color-difference signals converted to 4:2:0.

11. The picture signal encoding apparatus as claimed in claim 1, wherein the picture signals are television signals of the NTSC system.

12. The picture signal encoding apparatus as claimed in claim 1, wherein the picture signals are television signals of the PAL system.

13. A picture signal decoding apparatus for expansion-decoding compression-coded picture signals, the apparatus comprising:
    first expansion decoding means for expansion-decoding basic picture data of a predetermined signal standard having a sampling frequency ratio of a luminance signal and two color-difference signals of 4:1:1 or 4:2:0, the basic picture data being generated by compression-coding original picture signals;
    second expansion decoding means for expansion-decoding enhancement data having a sampling frequency ratio of a luminance signal and two color-difference signals of 4:2:2; and
    synthesizing means for synthesizing outputs from the first expansion decoding means and the second expansion decoding means so as to generate extended picture data having a sampling frequency ratio of a luminance signal and two color-difference signals of 4:2:2.

14. The picture signal decoding apparatus as claimed in claim 13, wherein the first expansion decoding means has sampling frequency converting means for converting the sampling frequency of a chroma signal of the picture signals.

15. The picture signal decoding apparatus as claimed in claim 13, wherein the first expansion decoding means and the second expansion decoding means carry out expansion decoding, using inverse discrete cosine transform.

16. The picture signal decoding apparatus as claimed in claim 13, wherein the second expansion decoding means carries out expansion decoding, using inverse wavelet transform or subband synthesis.

17. The picture signal decoding apparatus as claimed in claim 13, further comprising a band synthesis filter for synthesizing chroma signals expansion-decoded by the first expansion decoding means and the second expansion decoding means.

18. The picture signal decoding apparatus as claimed in claim 13, wherein the picture signals of the predetermined signal standard are television signals of the NTSC system.

19. The picture signal decoding apparatus as claimed in claim 13, wherein the picture signals of the predetermined signal standard are television signals of the PAL system.

20. A picture signal encoding apparatus for compression-coding picture signals, the apparatus comprising:
    converting means for converting the picture signals having a sampling frequency ratio of a luminance signal and two color-difference signals of 4:2:2 to basic picture signals having a sampling frequency ratio of a luminance signal and two color-difference signals of 4:1:1 or 4:2:0;
    first compressing means to which the basic picture signals converted by the converting means are inputted, the first compressing means being adapted for carrying out first compression so as to output first compressed data;
    encoding residual extracting means for extracting an encoding residual between the basic picture signals before compression and signals generated by decoding the compressed data; and
    second compressing means to which data indicating the extracted encoding residual is inputted, the second compressing means being adapted for outputting second compressed data generated by carrying out predetermined compression of the data.

21. The picture signal encoding apparatus as claimed in claim 20, wherein the converting means has sampling frequency converting means for converting the sampling frequency of a chroma signal of the picture signals, and converts the picture signals to the basic picture signals on the basis of the sampling frequency converting means.

22. The picture signal encoding apparatus as claimed in claim 21, wherein the first compressing means and the second compressing means have discrete cosine transform means for carrying out discrete cosine transform and compression of the basic picture signals and the encoding residual inputted thereto.

23. The picture signal encoding apparatus as claimed in claim 21, wherein the second compressing means carries out wavelet transform or subband coding to carry out the compression coding.

24. The picture signal encoding apparatus as claimed in claim 21, wherein the encoding residual extracting means has decoding means to which signals including the compressed data are inputted, the decoding means being adapted for decoding the compressed data, and
    arithmetic means to which the picture signals and the compressed data decoded by the decoding means are inputted, the arithmetic means being adapted for calculating a difference value between the picture signals and the decoded compressed data, so that an output from the arithmetic means is extracted as the encoding residual.

25. The picture signal encoding apparatus as claimed in claim 21, wherein the encoding residual extracting means has decoding means to which the compressed data is inputted, the decoding means being adapted for decoding the compressed data, and
    arithmetic means to which the basic picture signals from the converting means and the compressed data decoded by the decoding means are inputted, the arithmetic means being adapted for calculating a difference between the basic picture signals and the decoded compressed data, so that an output from the arithmetic means is extracted as the encoding residual.

26. The picture signal encoding apparatus as claimed in claim 21, wherein the encoding residual extracting means has decoding means to which the compressed data is inputted, the decoding means being adapted for decoding the compressed data, and arithmetic means for calculating a difference between a DCT coefficient of the basic picture signals and the compressed data decoded by the decoding means, so that an output from the arithmetic means is extracted as the encoding residual.

27. The picture signal encoding apparatus as claimed in claim 21, further comprising band dividing means for dividing the band of a chroma signal of the picture signals, wherein the converting means is supplied with low-frequency components of the chroma signal outputted from the band dividing means and the luminance signal of the picture signals, so as to output the basic picture signals, and the second compressing means is supplied with high-frequency components of the chroma signal outputted from the band dividing means along with the data indicating the encoding residual from the encoding residual extracting means, and carries out the second compression of the data indicating the encoding residual and the high-frequency components of the chroma signal so as to output the second compressed data.

28. A picture signal decoding apparatus for decoding compressed picture signals, the apparatus comprising:

first decoding means for decoding compressed first picture signals having a sampling frequency ratio of a luminance signal and two color-difference signals of 4:1:1;

second decoding means for decoding compressed second picture signals having a sampling frequency ratio of a luminance signal and two color-difference signals of 4:2:2; and synthesizing means for synthesizing an output from the first decoding means and an output from the second decoding means so as to generate picture signals having a sampling frequency ratio of a luminance signal and two color-difference signals of 4:2:2.

29. The picture signal decoding apparatus as claimed in claim 28, wherein the first decoding means has sampling frequency converting means for converting the sampling frequency of a chroma signal of the picture signals.

30. The picture signal decoding apparatus as claimed in claim 28, wherein the first decoding means and the second decoding means carry out decoding, using inverse cosine transform.

31. The picture signal decoding apparatus as claimed in claim 28, wherein the second decoding means carries out decoding, using inverse wavelet transform or subband synthesis.

32. The picture signal decoding apparatus as claimed in claim 28, further comprising band synthesis filter means for synthesizing chroma signals decoded by the first decoding means and the second decoding means.

* * * * *